US010741097B2

(12) United States Patent
Weerappuli et al.

(10) Patent No.: US 10,741,097 B2
(45) Date of Patent: Aug. 11, 2020

(54) JACKET FOR ANTHROPOMORPHIC TESTING DEVICE

(71) Applicant: Ford Global Technologies, LLC, Dearborn, MI (US)

(72) Inventors: Parakrama Valentine Weerappuli, West Bloomfield, MI (US); Srinivasan Sundararajan, Ann Arbor, MI (US); Kevin Michael Pline, Plymouth, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 251 days.

(21) Appl. No.: 15/900,005

(22) Filed: Feb. 20, 2018

(65) Prior Publication Data

US 2019/0259305 A1 Aug. 22, 2019

(51) Int. Cl.
*G09B 23/34* (2006.01)

(52) U.S. Cl.
CPC .................... *G09B 23/34* (2013.01)

(58) Field of Classification Search
CPC ....................................... G09B 23/34
USPC ......................................... 73/866.4
See application file for complete search history.

(56) References Cited

U.S. PATENT DOCUMENTS

| 4,441,211 A * | 4/1984 | Donzis | A41D 13/0153 |
| | | | 2/459 |
| 5,526,707 A | 6/1996 | Smrcka | |
| 5,528,943 A * | 6/1996 | Smrcka | G09B 23/281 |
| | | | 73/866.4 |
| 8,065,745 B2 * | 11/2011 | Huell | A41D 1/00 |
| | | | 2/64 |
| 2016/0078784 A1 | 3/2016 | Sullenberger et al. | |
| 2018/0277020 A1* | 9/2018 | Sundararajan | G01M 17/0078 |

FOREIGN PATENT DOCUMENTS

| CN | 104792545 A | 7/2015 |
| DE | 102005054542 A1 | 5/2007 |

OTHER PUBLICATIONS

Liberatore, "Meet the modern crash test dummies: Researchers create old and obese", DailyMail.com Jan. 26, 2017, http://www.dailymail.co.uk/sciencetech/article-4161958/Engineers-design-old-obese-crash-test-dummies.html.

* cited by examiner

*Primary Examiner* — Daniel S Larkin
(74) *Attorney, Agent, or Firm* — Frank A. MacKenzie; Bejin Bieneman PLC (57) ABSTRACT

A jacket includes a ventral piece; left and right inferior dorsal pieces shaped to cover a left and a right inferior dorsal torso, respectively; and a posterior piece shaped to cover a posterior. The ventral piece includes a ventral portion shaped to cover a ventral torso, a superior dorsal portion connected to the ventral portion and shaped to cover a superior dorsal torso, and a detachably attachable seam splitting the superior dorsal portion. The inferior dorsal pieces are each attachable to the ventral portion and detachably attachable to each other. The posterior piece is detachably attachable to the inferior dorsal pieces.

19 Claims, 6 Drawing Sheets

JACKET FOR ANTHROPOMORPHIC TESTING DEVICE

BACKGROUND

Anthropomorphic testing devices, sometimes called "dummies," are used to simulate human occupants during tests of impacts to vehicles. Anthropomorphic testing devices are generally shaped like humans and include sensors to record the effects on the dummy of an impact to a vehicle carrying the dummy. Anthropomorphic testing devices are available in standard sizes. The sizes are based on a stature percentile of a target population, e.g., North American adults. Typical sizes include 50th percentile male, 5th percentile female, and 95th percentile male.

DETAILED DESCRIPTION

A jacket includes a ventral piece; left and right inferior dorsal pieces shaped to cover a left and a right inferior dorsal torso, respectively; and a posterior piece shaped to cover a posterior and detachably attachable to the inferior dorsal pieces. The ventral piece includes a ventral portion shaped to cover a ventral torso, a superior dorsal portion connected to the ventral portion and shaped to cover a superior dorsal torso, and a detachably attachable seam splitting the superior dorsal portion. The inferior dorsal pieces are each attachable to the ventral portion and detachably attachable to each other.

The ventral piece, left and right inferior dorsal pieces, and posterior piece may be shaped to cover an anthropomorphic testing device of 50th-percentile male, female, or overall stature and 50th-percentile male, female, or overall weight. The ventral piece, left and right inferior dorsal pieces, and posterior piece may be collectively sized to represent a weight of a male, female, or human of at least 90th-percentile weight when covering the anthropomorphic testing device. The ventral piece, left and right inferior dorsal pieces, and posterior piece may be collectively sized to represent a volume of a male, female, or human of at least 90th-percentile weight when covering the anthropomorphic testing device.

The posterior piece may be shaped to cover the posterior of a person in a sitting position.

The detachably attachable seam may be a zipper.

The left and right inferior dorsal pieces may be zippable to each other.

The posterior piece may be zippable to the inferior dorsal pieces.

The jacket may further include left flexible stitching attaching the left inferior dorsal piece to the ventral portion and right flexible stitching attaching the right inferior dorsal piece to the ventral portion.

The left and right inferior dorsal pieces may be zippable to the ventral portion.

The posterior piece may be detachably attachable to the ventral portion.

The superior dorsal portion may not be directly attachable to the inferior dorsal pieces.

The ventral piece, left and right inferior dorsal pieces, and posterior piece may each include a central layer, a peripheral layer attached to the central layer, and an adipose-tissue analogue between the central layer and the peripheral layer. The adipose-tissue analogue may have a shear modulus in a range from zero GPa to $4\times10^{-5}$ GPa. The adipose-tissue analogue may have a damping coefficient in a range from 0.1 to 0.4. The adipose-tissue analogue may have a Poisson's ratio in a range from 0.3 to 0.5. The adipose-tissue analogue may be one of ballistic gelatin, polyurethane, and viscoelastic foam. The central layers and the peripheral layers may be fabric. The peripheral layer has an initial Young's modulus in a range from 1.5 kPa to 3.0 kPa and a final Young's modulus in a range from 10.0 kPa to 45.0 kPa.

With reference to the Figures, a jacket 30 includes a ventral piece 32; left and right inferior dorsal pieces 34, 36 shaped to cover a left and a right inferior dorsal torso, respectively; and a posterior piece 38 shaped to cover a posterior. The ventral piece 32 includes a ventral portion 40 shaped to cover a ventral torso, a superior dorsal portion 42 connected to the ventral portion 40 and shaped to cover a superior dorsal torso, and a detachably attachable seam 44 splitting the superior dorsal portion 42. The inferior dorsal pieces 34, 36 are each attachable to the ventral portion 40 and detachably attachable to each other. The posterior piece 38 is detachably attachable to the inferior dorsal pieces 34, 36.

Figure 2:
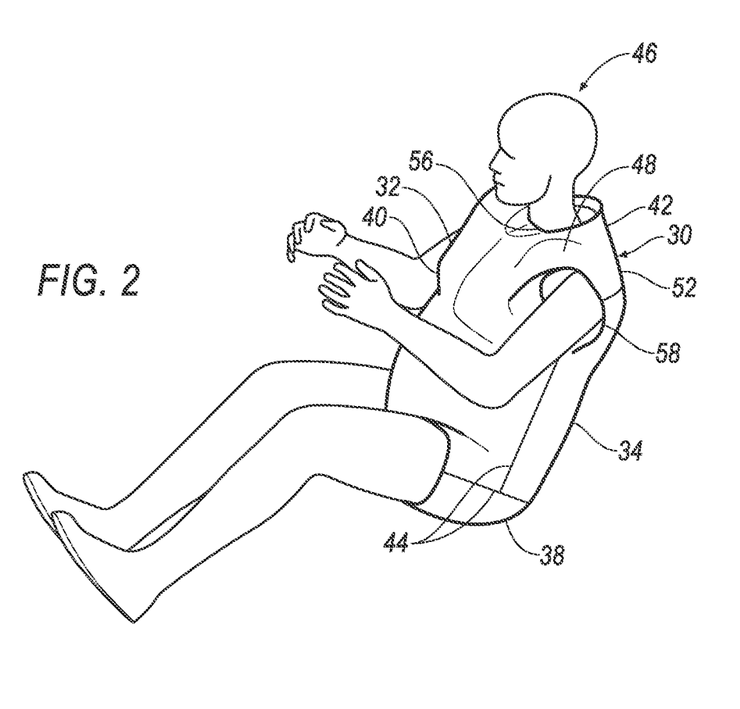
FIG. 2 is a perspective view of the anthropomorphic testing device wearing an example jacket.

With reference to FIG. 2, the jacket 30 permits safety testing with a standard-sized anthropomorphic testing device (ATD) 46 for simulating occupants who deviate from the standard size of the ATD 46, e.g., occupants who are overweight or obese, or who may be wearing bulky clothing. Using the jacket 30 is more cost-effective than developing new ATDs of different sizes. The jacket 30 is arranged so that connections between the pieces 32, 34, 36, 38 of the jacket 30 are spaced from where a seatbelt would extend over the ATD 46, whether the seatbelt is a three-point harness, a four-point harness, or a racing harness. Thus, the connections between the pieces 32, 34, 36, 38 of the jacket 30 do not interfere with testing the seatbelt.

Figure 1:
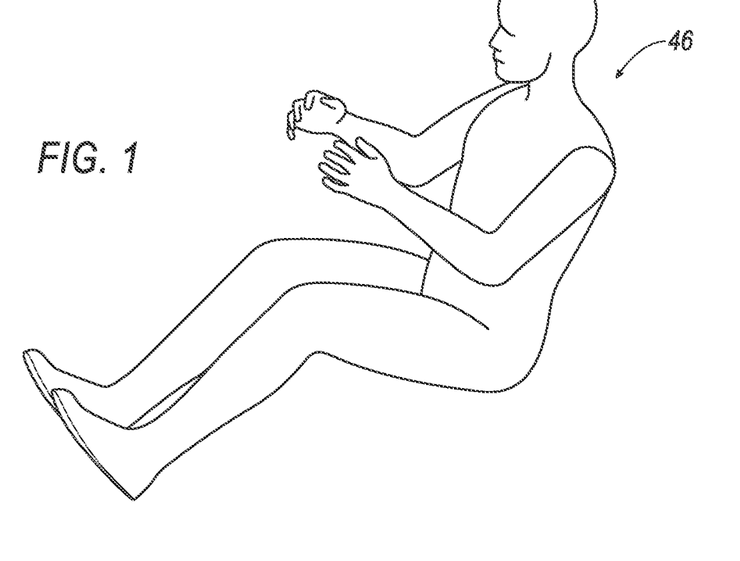
FIG. 1 is a perspective view of an anthropomorphic testing device.

With reference to FIG. 1, the ATD 46, sometimes called a dummy, is shaped like a human. The ATD 46 may be any suitable type for a desired type of testing, e.g., Hybrid III or THOR. A size of the ATD 46 may be chosen according to a placement in a distribution of an underlying population. For example, the ATD 46 may have a stature in the 50th percentile for males, for females, or for the overall population (both males and females), and the ATD 46 may likewise have a weight in the 50th percentile for males, for females, or for the overall population.

This disclosure uses anatomical terms of location with respect to a human body and to an ATD 46 interchangeably. For the purposes of this disclosure, "ventral" means tending toward a front or belly side of a body; "dorsal" means tending toward a back side of a body, the opposite of ventral; "superior" means tending toward a head; "inferior" means tending toward feet, the opposite of superior; "central"

means tending toward an inside of a body; and "peripheral" means tending toward an outside of a body, the opposite of central; "lateral" means tending toward a side of a body, i.e., left or right; "medial" means tending toward a middle of a body, the opposite of lateral.

With reference to FIGS. 3-6, the ventral piece 32, the inferior dorsal pieces 34, 36, and the posterior piece 38 may be shaped to cover the ATD 46 of 50th-percentile male, female, or overall stature and 50th-percentile male, female, or overall weight. The ventral piece 32, the inferior dorsal pieces 34, 36, and the posterior piece 38 may be collectively sized to represent a weight of a male, female, or human of at least 90th-percentile weight, e.g., 95th-percentile weight, when covering the ATD 46; in other words, the ATD 46 and the jacket 30 together weigh substantially the same as a male, female, or human of at least 90th-percentile weight. The ventral piece 32, the inferior dorsal pieces 34, 36, and the posterior piece 38 may be collectively sized to represent a volume of a male, female, or human of at least 90th-percentile weight, e.g., 95th-percentile weight, when covering the ATD 46; in other words, the ATD 46 and the jacket 30 together occupy substantially the same volume as a male, female, or human of at least 90th-percentile weight. The jacket 30 may thus be used together with the ATD 46 of 50th-percentile weight and stature to simulate an overweight occupant, e.g., an occupant of 50th-percentile stature and 95th-percentile size during testing.

The ventral piece 32 includes the ventral portion 40 and the superior dorsal portion 42. The ventral piece 32 is a unitary piece. For the purposes of this disclosure, "unitary" means that something is a single unit and cannot be separated into multiple units without physical damage.

The ventral portion 40 is shaped to cover a ventral torso, i.e., belly, chest, shoulders, etc. In other words, the ventral portion 40 is shaped to lie flush against a ventral torso, e.g., shaped to lie flush against all or most of the ventral torso. The ventral portion 40 may be shaped to cover a ventral torso of an ATD 46 of 50th-percentile stature and weight. The ventral portion 40 may be shaped to cover the ventral torso from below a waist to a top of shoulders and from a left lateral torso to a right lateral torso.

The superior dorsal portion 42 is connected to the ventral portion 40; specifically, the superior dorsal portion 42 is directly attached to the ventral portion 40 at a left shoulder connection 48 and at a right shoulder connection 50. The shoulder connections 48, 50 are not detachable without physically damaging the ventral piece 32.

The superior dorsal portion 42 is shaped to cover a superior dorsal torso, i.e., shoulder, shoulder blades, dorsal ribcage, etc. In other words, the superior dorsal portion 42 is shaped to lie flush against a superior dorsal torso, e.g., shaped to lie flush against all or most of a dorsal torso at a vertical position on a ribcage and above. The superior dorsal portion 42 may be shaped to cover a superior dorsal torso of an ATD 46 of 50th-percentile stature and weight. The superior dorsal torso may be shaped to cover the superior dorsal torso from a vertical position at or near the ribcage to the top of the shoulder and from a left shoulder blade to a right shoulder blade.

The superior dorsal portion 42 is split into a left superior dorsal portion 52 and a right superior dorsal portion 54. The left superior dorsal portion 52 and the right superior dorsal portion 54 are detachably attachable, as described in more detail below. The superior dorsal portion 42 may be split medially into the left superior dorsal portion 52 and the right superior dorsal portion 54. The left superior dorsal portion 52 may be symmetrical to the right superior dorsal portion 54.

Figure 3:
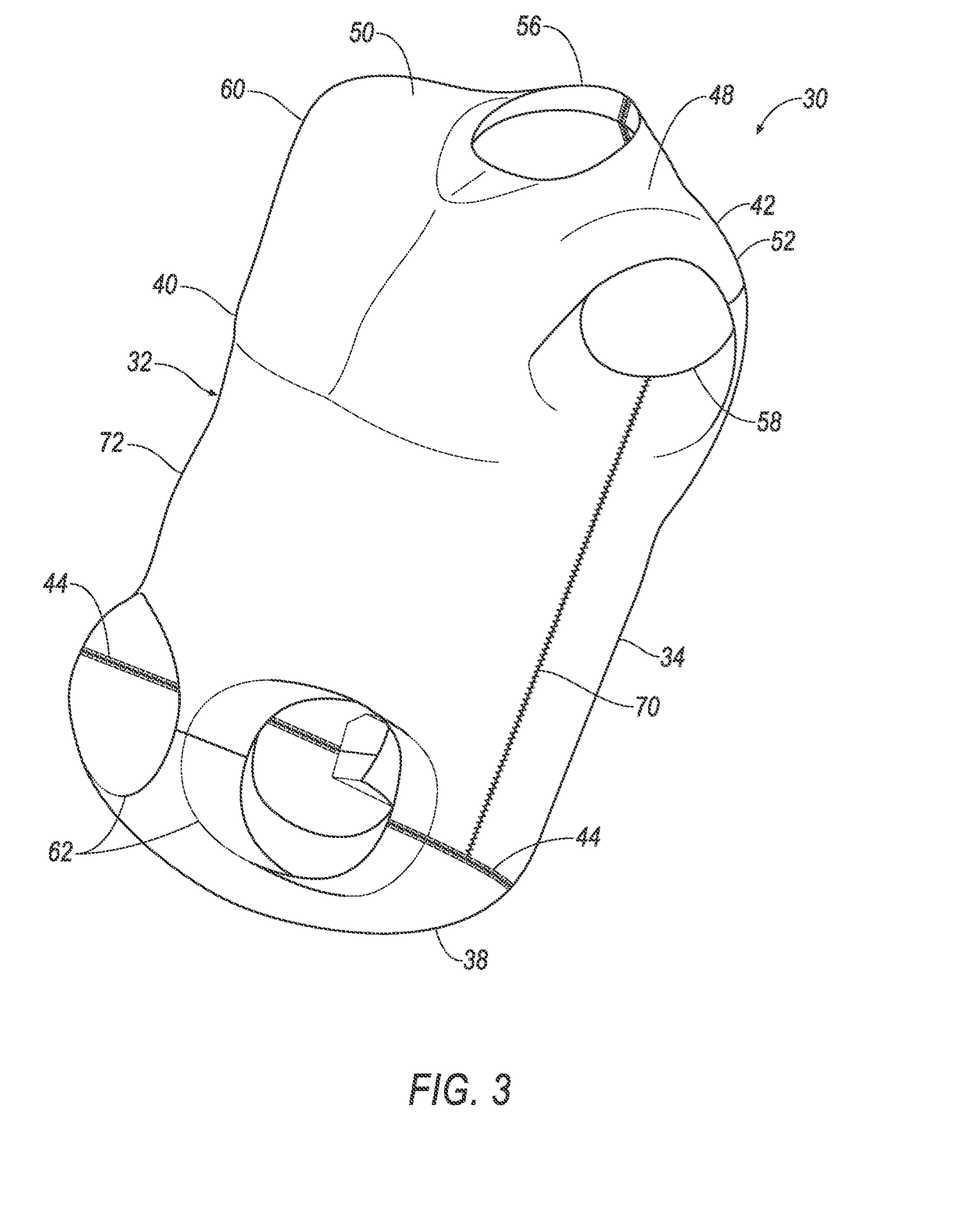
FIG. 3 is a perspective view of another example jacket.
Figure 4:
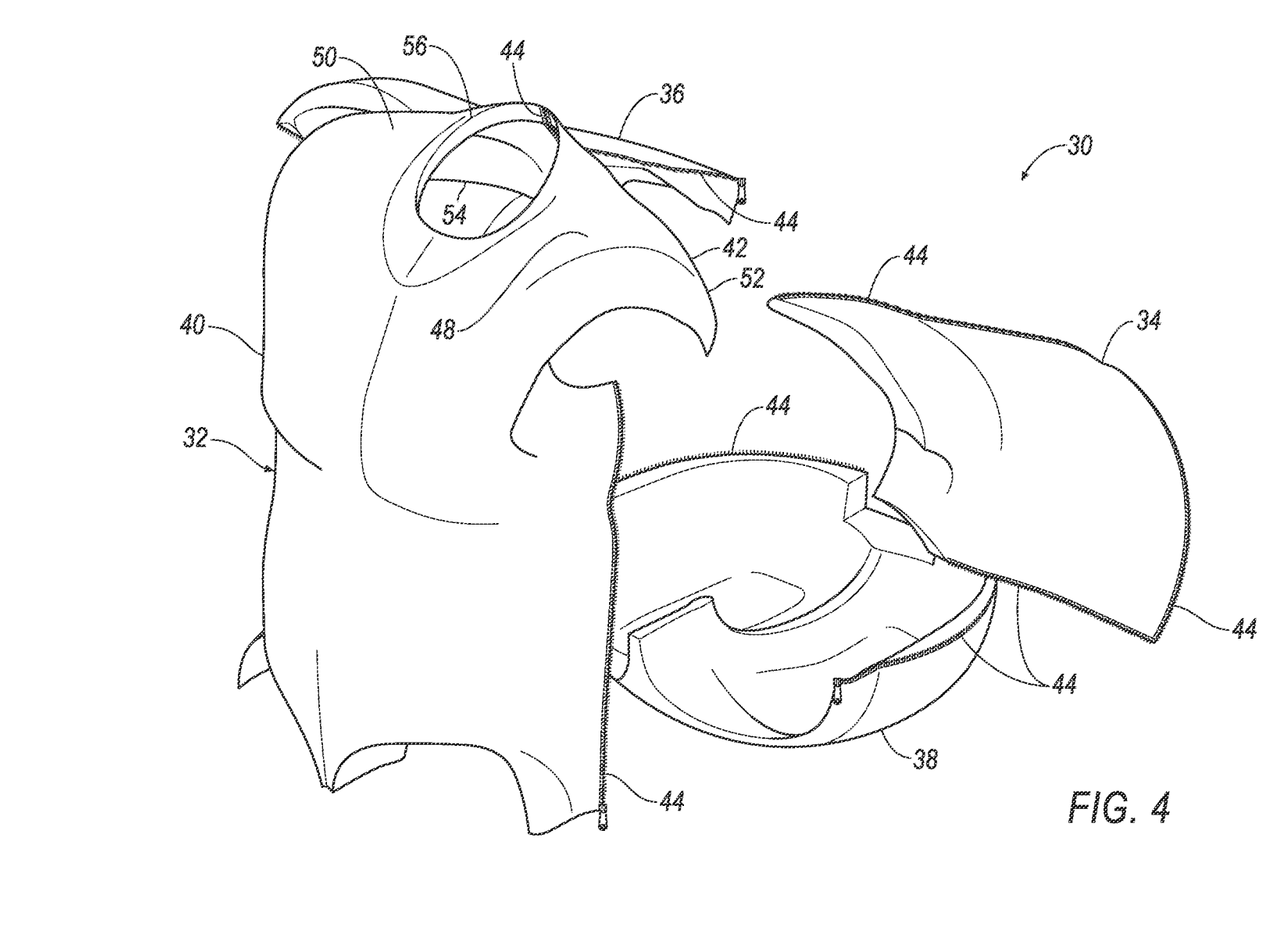
FIG. 4 is an exploded perspective view of the jacket of FIG. 2.
Figure 5:
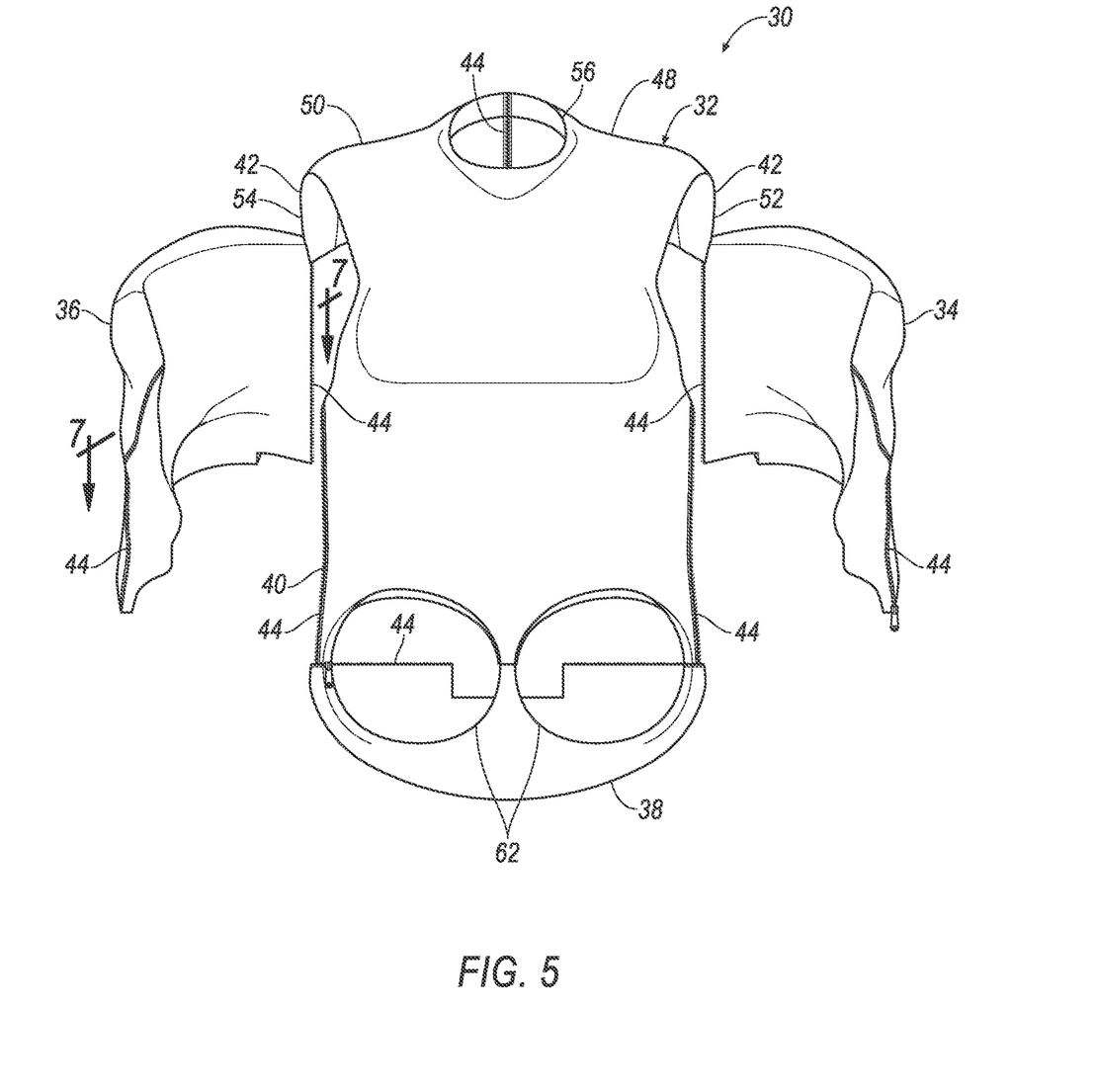
FIG. 5 is a front partially exploded view of the jacket of FIG. 2.
Figure 6:
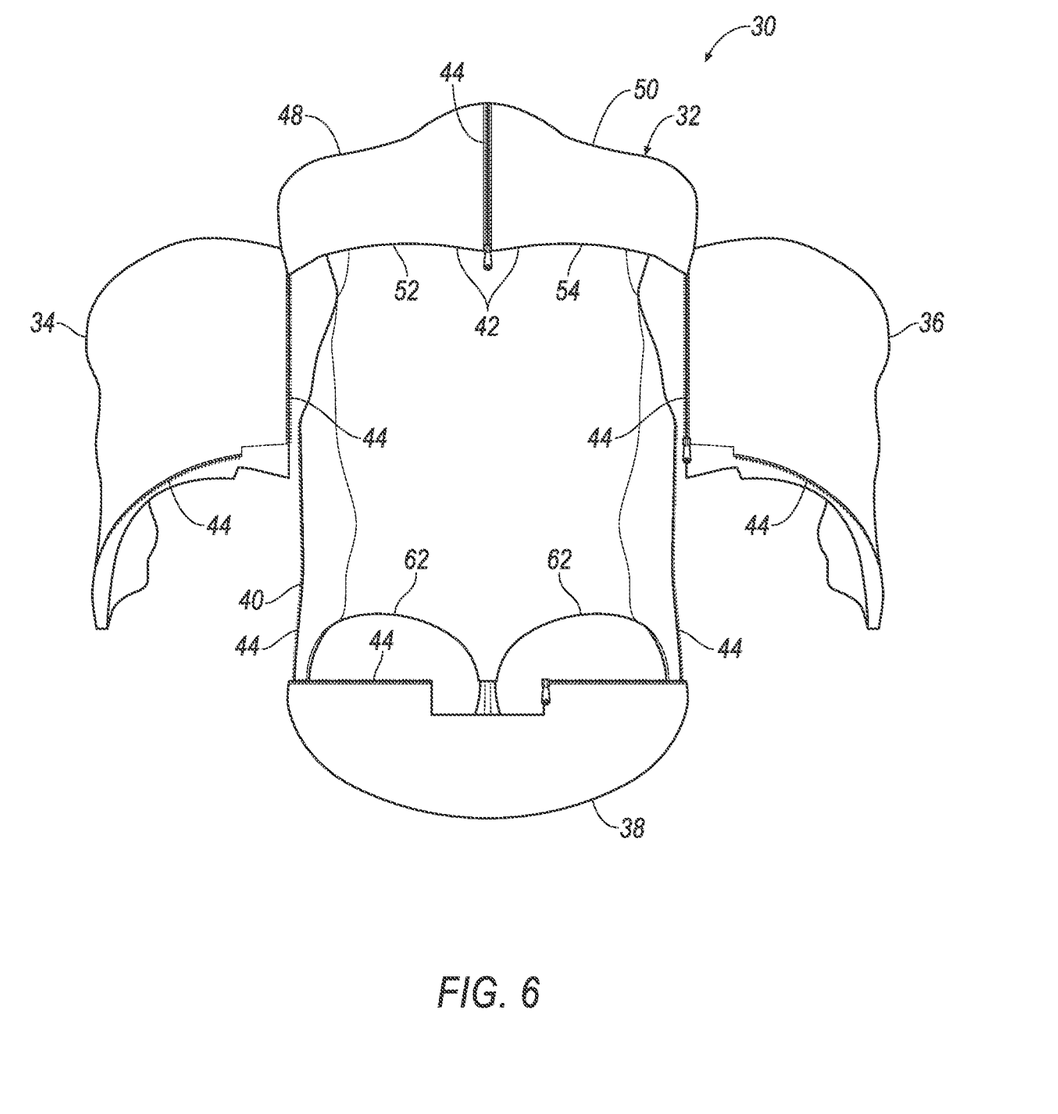
FIG. 6 is a rear partially exploded view of the jacket of FIG. 2.

With reference to FIGS. 2 and 3, the ventral piece 32 includes a neck hole 56. The neck hole 56 is sized to permit a neck of an ATD 46, e.g., a neck of an ATD 46 of 50th-percentile stature and weight. The neck hole 56 is defined by the ventral portion 40 and the superior dorsal portion 42.

With reference to FIGS. 3-6, the left inferior dorsal piece 34 may be symmetrical to the right inferior dorsal piece 36. The left inferior dorsal piece 34 is shaped to cover a left inferior dorsal torso, and the right inferior dorsal piece 36 is shaped to cover a right inferior dorsal torso. In other words, the left inferior dorsal piece 34 is shaped to lie flush against a left inferior dorsal torso, e.g., shaped to lie flush against all or most of a left inferior dorsal torso from a vertical position at or below a ribcage to a position at or above hips; likewise for the right inferior dorsal piece 36. The left and right inferior dorsal pieces 34, 36 may be shaped to cover a left and right inferior dorsal torso, respectively, of an ATD 46 of 50th-percentile stature and weight. The left inferior dorsal piece 34 may be shaped to cover a left inferior dorsal torso from a vertical position at or below the ribcage to a position at or above the hips and from a left lateral torso to a spine. The right inferior dorsal piece 36 may be shaped to cover a right inferior dorsal torso from a vertical position at or below the ribcage to a position at or above the hips and from a right lateral torso to a spine. The inferior dorsal pieces 34, 36 may each be unitary pieces.

With reference to FIGS. 2 and 3, the ventral piece 32 and the left inferior dorsal piece 34 together define a left armhole 58, and the ventral piece 32 and the right inferior dorsal piece 36 together define a right armhole 60. Specifically, the armholes 58, 60 are defined by the ventral portion 40, superior dorsal portion 42, and a respective one of the inferior dorsal pieces 34, 36. The armholes 58, 60 are each sized to permit an upper arm of an ATD 46 of 50th-percentile stature and weight.

With reference to FIGS. 3-6, the posterior piece 38 is shaped to cover a posterior, i.e., hips, butt, groin, etc. In other words, the posterior piece 38 is shaped to lie flush against a posterior, e.g., all or most of a butt. The posterior piece 38 may be shaped to cover the posterior of a person or ATD 46 in a sitting position. Specifically, the posterior piece 38 may be shaped to cover a posterior of an ATD 46 of 50th-percentile stature and weight in a sitting position. The posterior piece 38 may be shaped to cover a posterior from legs to a vertical position on the hips and from a left lateral hip to a right lateral hip. The posterior piece 38 may be a unitary piece.

With reference to FIGS. 2 and 3, the ventral piece 32 and the posterior piece 38 together define two leg holes 62. Specifically, the leg holes 62 are defined by the ventral portion 40 and the posterior piece 38. The leg holes 62 are each sized to permit a thigh of an ATD 46 of 50th-percentile stature and weight.

Figure 7:
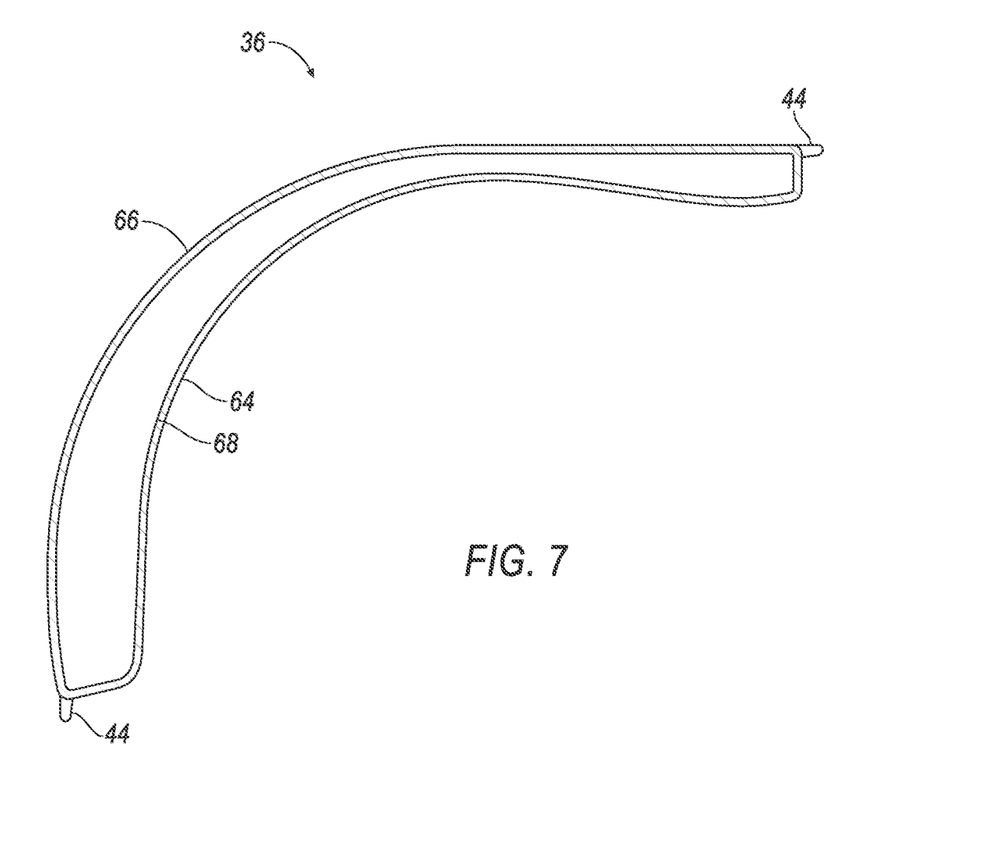
FIG. 7 is a cross-sectional view of a right inferior dorsal piece of the jacket of FIG. 2 along line 7-7 in FIG. 5.

With reference to FIG. 7, the ventral piece 32, left and right inferior dorsal pieces 34, 36, and posterior piece 38 each include a central layer 64 and a peripheral layer 66. The peripheral layer 66 is attached to the central layer 64 for each of the pieces 32, 34, 36, 38. The central layers 64 are disposed to contact the ATD 46 when the jacket 30 is worn by an ATD 46. The central layers 64 and the peripheral layers 66 may be fabric. The central layers 64 may be sewn or otherwise attached to the peripheral layers 66 around outer edges of the central layers 64 and peripheral layers 66.

The peripheral layers 66 may have material properties mimicking human skin. For example, the peripheral layers 66 may have an initial Young's modulus in a range from 1.5 kPa to 3.0 kPa and a final Young's modulus in a range from 10.0 kPa to 45.0 kPa.

An adipose-tissue analogue 68 may be disposed between each central layer 64 and the respective peripheral layer 66. A central layer 64 and a peripheral layer 66 may be sewn or otherwise attached together around and enclosing each adipose-tissue analogue 68. The adipose-tissue analogue 68 may have a thickness that is variable with each of the pieces 32, 34, 36, 38. The variable thickness may be chosen and contoured to represent a difference in size between, e.g., an ATD 46 of 50th-percentile stature and 50th-percentile weight and a person of 50th-percentile stature and 95th-percentile weight.

The adipose-tissue may have material properties mimicking human tissue, e.g., adipose (fatty) tissue. For example, the adipose-tissue analogue 68 may have a shear modulus in a range from zero GPa to $4\times10^{-5}$ GPa. For another example, the adipose-tissue analogue 68 may have a damping coefficient in a range from 0.1 to 0.4. For yet another example, the adipose-tissue analogue 68 may have a Poisson's ratio in a range from 0.3 to 0.5. Example materials for the adipose-tissue analogue 68 include ballistic gelatin, polyurethane, and viscoelastic foam.

Some of the pieces 32, 34, 36, 38 are detachably attachable to other of the pieces 32, 34, 36, 38. For the purposes of this disclosure, "detachably attachable" means that two objects can be attached to each other and that the two objects can be detached from each other in a manner that does not damage either of the two objects and allows the two objects to be reattached. Pieces 32, 34, 36, 38 that are detachably attachable to each other are connected by detachably attachable seams 44. The detachably attachable seams 44 may be any connection mechanism able to detach and reattach without damage, e.g., zippers, hook-and-loop fasteners such as Velcro®, buttons, lacing, etc., or a mixture.

The left superior dorsal portion 52 and the right superior dorsal portion 54 are detachably attachable, e.g., zippable, to each other. One of the detachably attachable seams 44 splits the superior dorsal portion 42 into the left superior dorsal portion 52 and the right superior dorsal portion 54. The detachably attachable seam 44 in the superior dorsal portion 42 may be oriented vertically and medially, e.g., covering a spine of an ATD 46. The detachably attachable seam 44 in the superior dorsal portion 42 may terminate at the neck hole 56.

The superior dorsal portion 42 may be not directly attachable to the inferior dorsal pieces 34, 36. When the jacket 30 is worn by an ATD 46, a gap may be disposed between the superior dorsal portion 42 and the inferior dorsal pieces 34, 36, or the superior dorsal portion 42 and the inferior dorsal pieces 34, 36 may contact each other without being attached. The superior dorsal portion 42 may be attached indirectly to the inferior dorsal pieces 34, 36 via the ventral portion 40.

The left and right inferior dorsal pieces 34, 36 are detachably attachable, e.g., zippable, to each other. One of the detachably attachable seams 44 can connect the left and right inferior dorsal pieces 34, 36. The detachably attachable seam 44 between the inferior dorsal pieces 34, 36 may be oriented vertically and medially, e.g., covering a spine of an ATD 46.

The left and right inferior dorsal pieces 34, 36 may each be detachably attachable, e.g., zippable, to the ventral portion 40, as shown in FIGS. 2 and 4-6, or attached to the ventral portion 40, as shown in FIG. 3. For example, one of the detachably attachable seams 44 may attach the left inferior dorsal piece 34 to the right inferior dorsal piece 36, as shown in FIGS. 2 and 4-6. Alternatively, for example, flexible stitching 70, 72 may directly attach the inferior dorsal pieces 34, 36 to the ventral portion 40, as shown in FIG. 3. The flexible stitching 70, 72 can longitudinally deform elastically, i.e., reversibly, by at least 50% lengthwise. Left flexible stitching 70 may attach the left inferior dorsal piece 34 to the ventral portion 40, and right flexible stitching 72 may attach the right inferior dorsal piece 36 to the ventral portion 40. The detachably attachable seams 44 or seams of flexible stitching 70, 72 attaching the ventral portion 40 to the inferior dorsal pieces 34, 36 may be oriented vertically and laterally, and may terminate at the armholes 58, 60.

The posterior piece 38 is detachably attachable, e.g., zippable, to the inferior dorsal pieces 34, 36. One of the detachably attachable seams 44 can connect the posterior piece 38 and the left inferior dorsal piece 34, and one of the detachably attachable seams 44 can connect the posterior piece 38 and the right inferior dorsal piece 36. The detachably attachable seams 44 between the posterior piece 38 and the inferior dorsal pieces 34, 36 may be oriented horizontally and laterally and may cover hips of an ATD 46.

The posterior piece 38 may be detachably attachable, e.g., zippable, to the ventral portion 40. One of the detachably attachable seams 44 can connect the posterior piece 38 and the ventral portion 40. The detachably attachable seam 44 between the ventral portion 40 and the posterior piece 38 may be oriented horizontally and may be disposed between the leg holes 62.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A jacket comprising:
    a ventral piece including a ventral portion shaped to cover a ventral torso, a superior dorsal portion connected to the ventral portion and shaped to cover a superior dorsal torso, and a detachably attachable seam splitting the superior dorsal portion;
    left and right inferior dorsal pieces shaped to cover a left and a right inferior dorsal torso, respectively, the inferior dorsal pieces each being attachable to the ventral portion and detachably attachable to each other; and
    a posterior piece shaped to cover a posterior and detachably attachable to the inferior dorsal pieces;
    wherein the ventral portion and the posterior piece together define two leg holes.

2. The jacket of claim 1, wherein the ventral piece, left and right inferior dorsal pieces, and posterior piece are shaped to cover an anthropomorphic testing device of 50th-percentile male, female, or overall stature and 50th-percentile male, female, or overall weight.

3. The jacket of claim 2, wherein the ventral piece, left and right inferior dorsal pieces, and posterior piece are collectively sized to represent a weight of a male, female, or human of at least 90th-percentile weight when covering the anthropomorphic testing device.

4. The jacket of claim 2, wherein the ventral piece, left and right inferior dorsal pieces, and posterior piece are collectively sized to represent a volume of a male, female, or human of at least 90th-percentile weight when covering the anthropomorphic testing device.

5. The jacket of claim 1, wherein the posterior piece is shaped to cover the posterior of a person in a sitting position.

6. The jacket of claim 1, wherein the detachably attachable seam is a zipper.

7. The jacket of claim 1, wherein the left and right inferior dorsal pieces are zippable to each other.

8. The jacket of claim 1, wherein the posterior piece is zippable to the inferior dorsal pieces.

9. The jacket of claim 1, further comprising left flexible stitching attaching the left inferior dorsal piece to the ventral portion and right flexible stitching attaching the right inferior dorsal piece to the ventral portion.

10. The jacket of claim 1, wherein the left and right inferior dorsal pieces are zippable to the ventral portion.

11. The jacket of claim 1, wherein the posterior piece is detachably attachable to the ventral portion.

12. The jacket of claim 1, wherein the superior dorsal portion is not directly attachable to the inferior dorsal pieces.

13. The jacket of claim 1, wherein the ventral piece, left and right inferior dorsal pieces, and posterior piece each include a central layer, a peripheral layer attached to the central layer, and an adipose-tissue analogue between the central layer and the peripheral layer.

14. The jacket of claim 13, wherein the adipose-tissue analogue has a shear modulus in a range from zero GPa to $4 \times 10^{-5}$ GPa.

15. The jacket of claim 13, wherein the adipose-tissue analogue has a damping coefficient in a range from 0.1 to 0.4.

16. The jacket of claim 13, wherein the adipose-tissue analogue has a Poisson's ratio in a range from 0.3 to 0.5.

17. The jacket of claim 13, wherein the adipose-tissue analogue is one of ballistic gelatin, polyurethane, and viscoelastic foam.

18. The jacket of claim 13, wherein the central layers and the peripheral layers are fabric.

19. The jacket of claim 13, wherein the peripheral layer has an initial Young's modulus in a range from 1.5 kPa to 3.0 kPa and a final Young's modulus in a range from 10.0 kPa to 45.0 kPa.

* * * * *